United States Patent

Beard et al.

[11] Patent Number: 5,847,954
[45] Date of Patent: Dec. 8, 1998

[54] METHOD AND APPARATUS FOR USING TRANSLATED AND RAW GUEST KEYBOARD INPUT IN A HOST SHARED APPLICATION PROGRAM

[75] Inventors: Albert L. Beard, Portland; William C. DeLeeuw; James Thompson, both of Hillsboro, all of Oreg.

[73] Assignee: Intel Corporation, Santa Clara, Calif.

[21] Appl. No.: 579,971

[22] Filed: Dec. 28, 1995

[51] Int. Cl.$^6$ .................................................. G06F 3/023
[52] U.S. Cl. .......................... 364/189; 395/887; 395/681
[58] Field of Search ..................................... 395/680, 681, 395/682, 200.01, 887; 364/188, 189; 345/171

[56] References Cited

U.S. PATENT DOCUMENTS

| | | | |
|---|---|---|---|
| 4,124,843 | 11/1978 | Bramson et al. | 345/171 |
| 4,404,551 | 9/1983 | Howse et al. | 395/189 |
| 4,972,368 | 11/1990 | O'Brien et al. | 395/887 |
| 5,261,079 | 11/1993 | Cell, Jr. | 395/500 |
| 5,276,896 | 1/1994 | Rimmer et al. | 395/800 |
| 5,432,935 | 7/1995 | Kato et al. | 395/682 |
| 5,631,643 | 5/1997 | Hisamori et al. | 364/188 |

*Primary Examiner*—Tod R. Swann
*Assistant Examiner*—Gary J. Portka
*Attorney, Agent, or Firm*—William H. Murray, Esq.

[57] ABSTRACT

Host translation of guest keyboard events is blocked to effectively isolate a guest keyboard from a host keyboard during applications sharing. A guest keyboard driver translates guest keyboard events which are transmitted to a host for use in shared applications. A patch instruction is written over a host keyboard event module which causes a jump to a patch subroutine when an attempt is made to deposit host keyboard events in the storage queue. Host keyboard events are marked by the patch subroutine and the marked host events are deposited in a shadow queue which is disposed in parallel with the host storage queue. Translated guest events also are deposited in the shadow queue. Raw host and guest keyboard events are stored in the host storage queue. When a shared application requires data from the host storage queue, a call for a translation of the outgoing data is made. In the event that the data is guest data, a second patch instruction on the module supervising the translation call causes a jump to a second patch subroutine, which bypasses the translation call and causes entry of the pretranslated guest event from the shadow queue into the shared application. If the outgoing event is a host event, the second patch instruction jumps to the second patch subroutine, which writes the translation instructions over the second patch so that the translating module can execute the translation. The translated host event then can be entered into the shared application. The second patch instruction is rewritten over the module supervising the translation.

30 Claims, 5 Drawing Sheets

METHOD AND APPARATUS FOR USING TRANSLATED AND RAW GUEST KEYBOARD INPUT IN A HOST SHARED APPLICATION PROGRAM

BACKGROUND OF THE INVENTION

1. Field of the Invention

This invention relates to the field of applications sharing between computers.

2. Description of the Related Art

Applications sharing involves the sharing of one or more application programs between two or more computer users. The application(s) resides on a host computer, and is shared with one or more remote computers, generally identified as guests. All alphanumeric input to the shared application(s) is via a shared keyboard input stream. The shared input stream actually is part of the host system, since the shared application(s) resides on and is implemented by the host system. Furthermore, the host's keyboard driver is used for translating into operating system characters all raw keyboard input, regardless of whether the input originated from the guest or the host. For example, conventionally in a host-guest(s) shared application(s) configuration, a guest keyboard driver generates keyboard events which are translated into operating system characters by the keyboard driver of the host. Conventionally, therefore, the host keyboard driver is responsible for converting raw guest input data into useful operating system characters.

A potential problem exists when a guest and the host use different keyboards and/or keyboard drivers. Typically, a keyboard driver is configured to translate commands which are in a single, defined language, e.g. English. Since the host's keyboard driver likely will be configured to understand and convert to operating system characters raw input which is in the host's language, the input from the guest might be mistranslated by the host keyboard driver and could generate unpredictable and erroneous operating system characters. Furthermore, raw data input from a guest keyboard that is configured differently than the host keyboard might be mistranslated if translated by the host and not the guest keyboard driver.

An application sharing system is needed, therefore, wherein raw data input by a guest, is translated by the keyboard driver of the guest and not the host. The operating system characters generated and translated by the guest keyboard driver, which are typically universal, can then be sent for use by a shared application. This would rectify the common problem of erroneous translations by the host keyboard driver of guest raw keyboard input in applications sharing between participants having different keyboard or key mappings and/or different keyboard drivers. Such a configuration also would completely isolate the host and guest keyboards so that a change in a keyboard state of one (Caps lock, Shift lock, Num lock, pending dead keys, etc.) will not affect the other.

SUMMARY OF THE INVENTION

The invention concerns sharing of one or more applications by a host and at least one guest, the host and at least one guest generating host and guest raw keyboard input, respectively, wherein a translated guest character is received by a host, the guest generating the translated guest character by translating guest raw keyboard input. The translated guest character is used in a shared application.

BRIEF DESCRIPTION OF THE DRAWINGS

The following detailed description will be more fully understood with reference to the accompanying drawings in which.

DETAILED DESCRIPTION OF THE PREFERRED EMBODIMENTS

Figure 1:
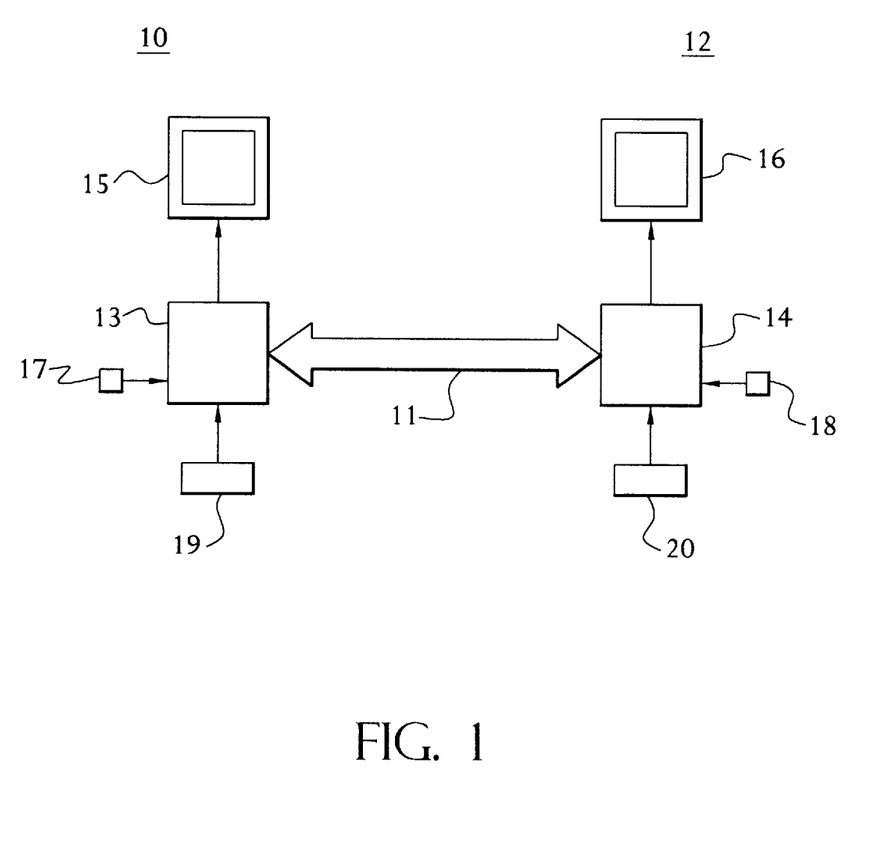
FIG. 1 is a block diagram of coupled applications-sharing hardware, including a host computer and a guest computer.

Referring to FIG. 1, two or more remote computer devices, such as remote personal computers are coupled to share applications. A first computer 10 is bidirectionally coupled over network 11 to second computer 12. Network 11 is preferably a local area network (LAN) or wide area network (WAN) and may be, for example, a connection made by a digital data line, telephone line, optical fiber, satellite or microwave transmission, coaxial cable or any other suitable communications link. First and second computers 10 and 12 include, for example, central processing units (CPUs) 13, 14 coupled to monitors 15, 16, respectively, for data display. Mouse devices 17, 18 and keyboards 19, 20 are coupled to CPUs 13, 14, respectively, for data input. Although FIG. 1 shows only two remote computer devices coupled by bidirectional network 11, additional computer devices may be coupled over network 11 in such a manner as to share applications and, as will be explained below, this invention can be used on such configurations having more than two participants.

Figure 2:
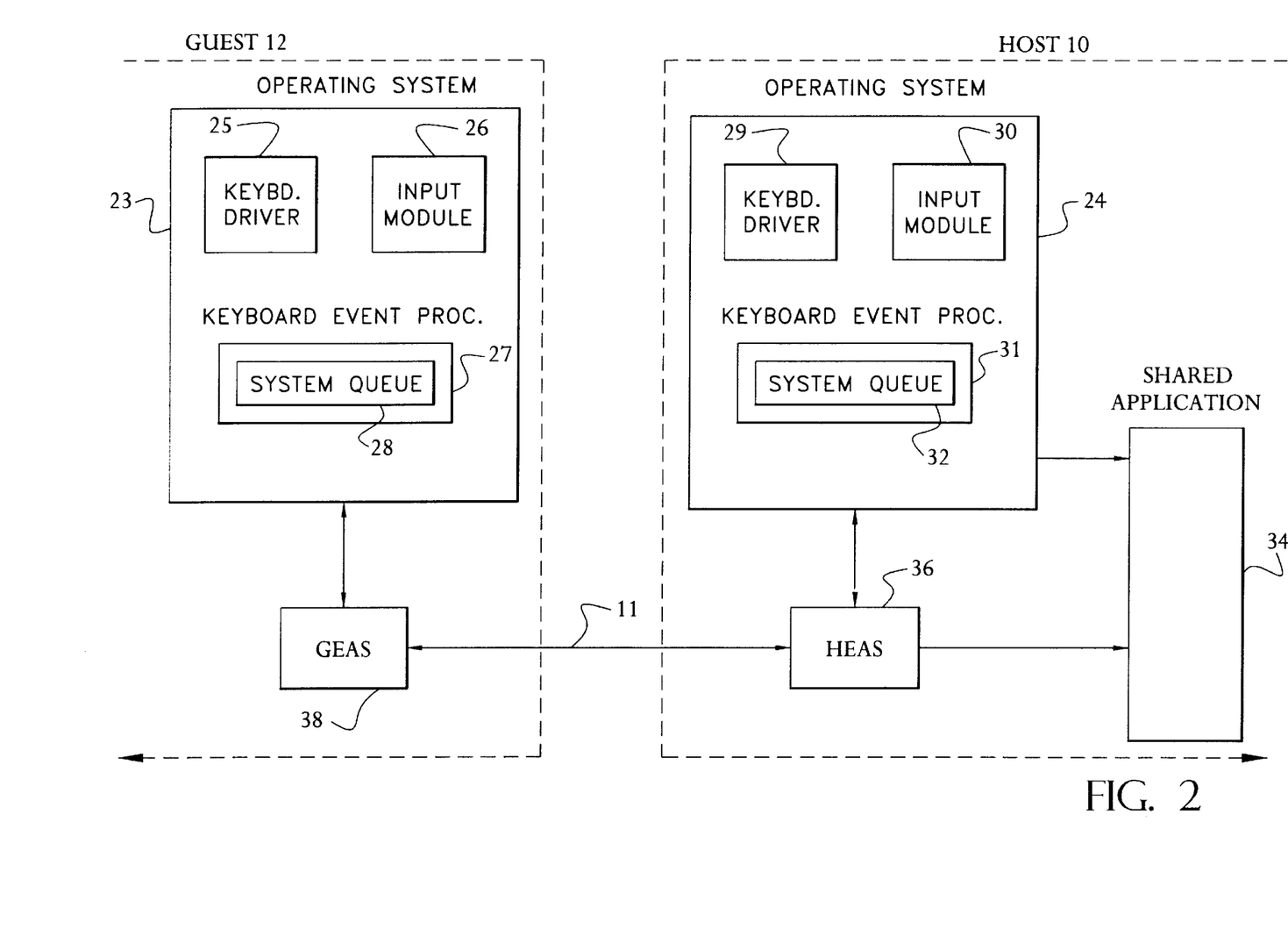
FIG. 2 is a block diagram of software architecture of an applications-sharing system of the invention.

Referring now to FIG. 2, software architecture for an embodiment of the invention concerning application sharing between host 10 and guest 12 is shown. Host 10 and guest 12 are coupled via bidirectional data network 11. Each of guest 12 and host 10 include respective operating systems 23 and 24. Operating systems 23 and 24 manage the hardware resources of guest 12 and host 10, respectively, and invoke and control other programs resident in memory accessible by guest 12 and host 10 (not shown in FIG. 2).

Operating systems 23 and 24 of guest 12 and host 10 include various subroutines including input modules 26, 30, respectively. Input modules 26 and 30 generally govern the interface between operating systems 23 and 24 and a user or users at guest 12 and host 10, respectively, and invoke and control other subroutines which are part of operating systems 23 and 24, such as keyboard drivers 25 and 29 and keyboard event modules 27 and 31, respectively. Keyboard event modules 27 and 31 can be standard "WINDOWS" application programming interfaces (API), such as keyboard event procedures. Keyboard drivers 25 and 29 typically generate keyboard events in association with input from a keyboard and translate raw keyboard events into operating system characters which are more readily used by, for example, shared application 34. Keyboard event procedures 27 and 31 manage events from keyboard drivers 25 and 29. For example, keyboard event procedures 27 and 31 manage placement of, for example, keyboard events, into system queues 28 and 32, respectively.

In the embodiment shown in FIG. 2, a single application program 34 is being shared. Shared application 34 is implemented on host 10, i.e. is loaded into RAM memory associated with host 10, but remains accessible for data input from and output to, and further interaction with, guest 12, via bidirectional network 11. Shared application 34 may be, for example, a word processing program enabling creation, editing, printing, etc. of text, which is displayed to participants on video display monitors at guest 12 and host 10 (not shown). Alternatively, shared application 34 may be any other suitable type of application program.

The software architecture of host 10 also includes host-executed application-sharing (HEAS) program 36. Similarly, guest 12 is provided with guest-executed application-sharing program (GEAS) 38. HEAS 36 and GEAS 38 enable host 10 and guest 12, respectively, to share shared application 34, thereby enabling data entry from and essentially simultaneous output of data to each of guest 12 and host 10. For example, where shared application 34 is a word processing program, users at host 10 and guest 12 may share and operate on the same document, such as by creating, editing, or deleting text. The output of shared application 34 appears essentially simultaneously on monitors (not shown in FIG. 2) associated with host and guest 10 and 12, respectively. A person of ordinary skill will recognize that more than one guest may share application 34, i.e., more than one guest can be coupled to host 10 and to other guests, and input to and receive output from shared application 34 resident on host 10, in the manner described above. A person of ordinary skill also will recognize that more than one application may be shared by a host and one or more guests.

Figure 3:
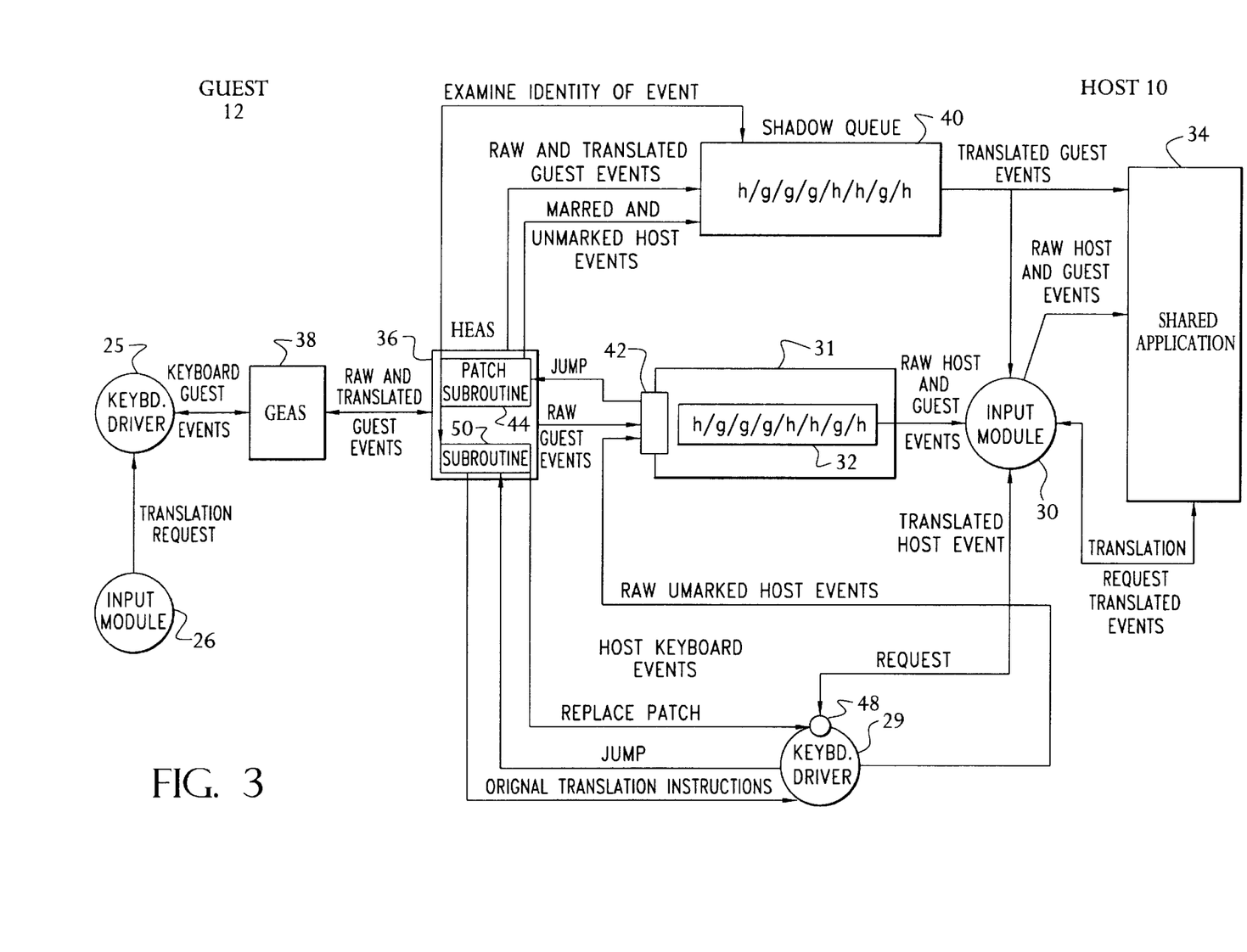
FIG. 3 is a further block diagram of software architecture of a preferred embodiment of the invention.
Figure 4A:
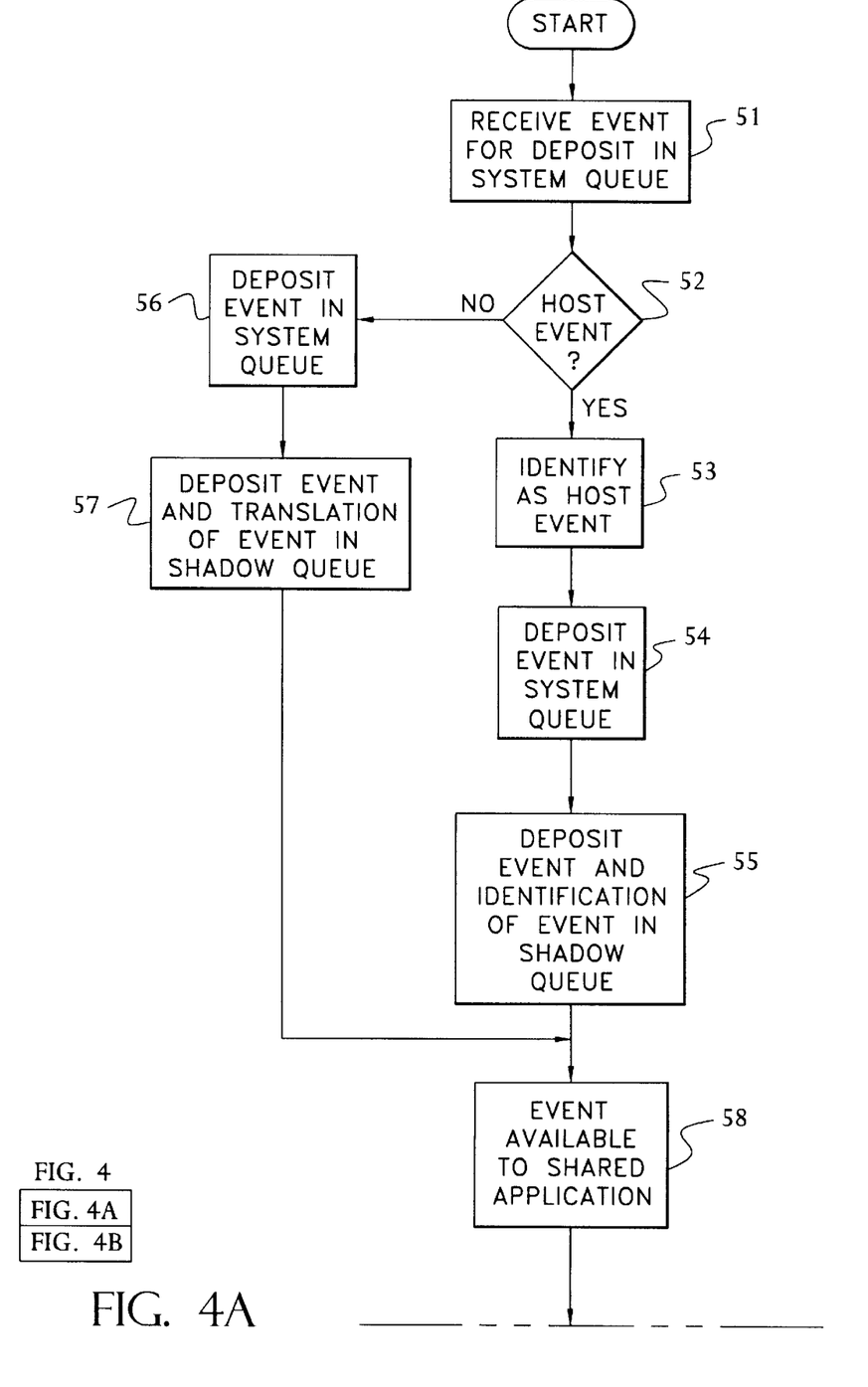
FIG. 4 is a flow chart diagram of the preferred embodiment of the invention shown in FIG. 3.
Figure 4B:
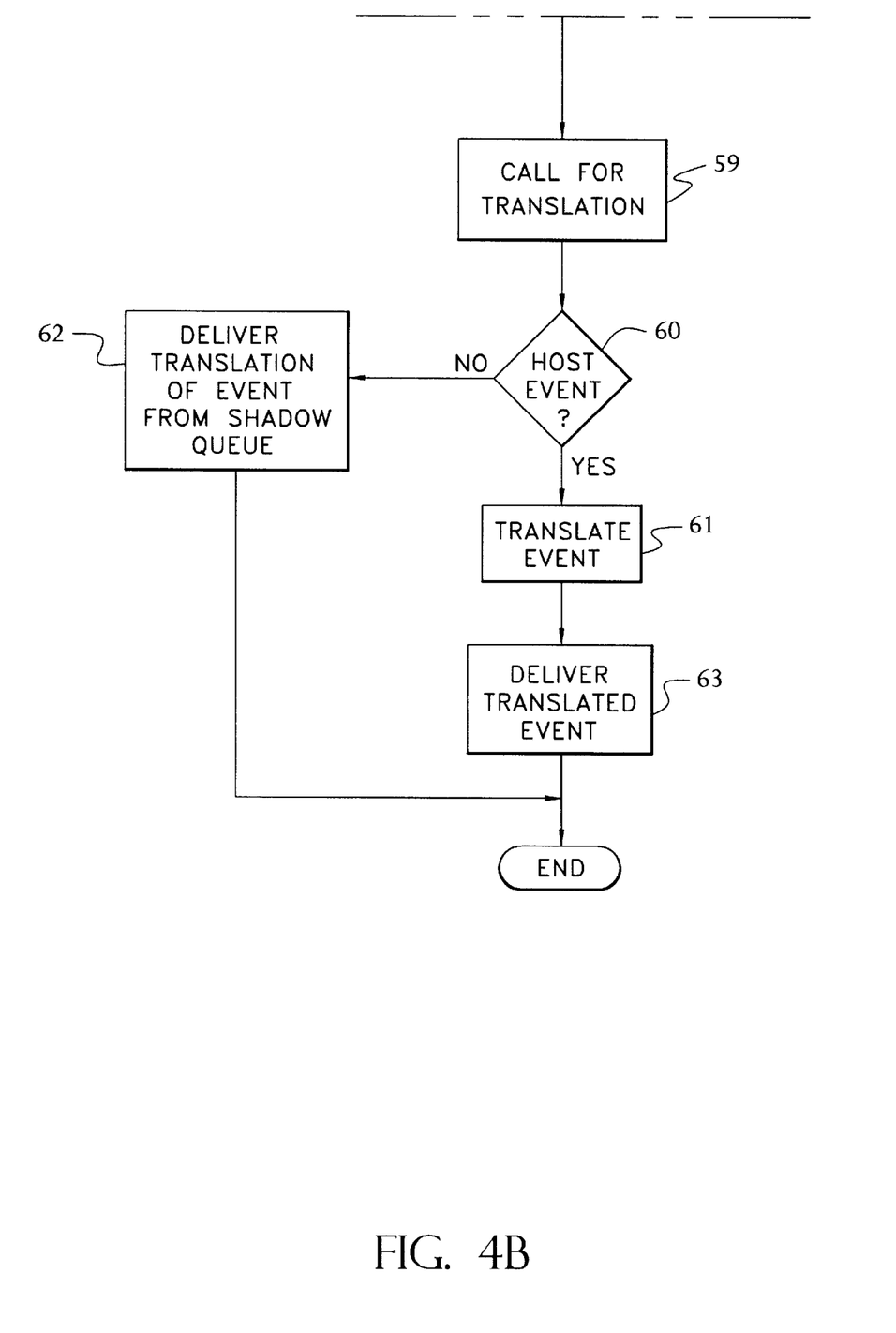

Referring now to FIGS. 3 and 4, the architecture of a preferred embodiment of the invention is shown in FIG. 3. Generally, in the preferred embodiment of the invention GEAS 38 instructs, for example, input module 26 to call guest keyboard driver 25 to translate into operating system characters any guest keyboard events prior to their transmission for use by host 10 and shared application 34. In the invention, guest 12 does not rely on host keyboard driver 29 for translation of guest keyboard events, as is done in conventional systems. Instead, for example, guest keyboard driver 25 is instructed by GEAS 38, through for example input module 26 to translate all guest keyboard events which are to be shared with host 10, prior to transmitting them to host 10 through network 11. Guest 12 and GEAS 38 continue to deliver raw guest keyboard events along with the translated events (operating system characters) from guest keyboard driver 25 for reasons to be explained below. The raw and translated guest keyboard data is delivered, for example, by GEAS 38 through network 11 to host 10.

Keyboard event module 31 of host 10 handles placement of raw keyboard events from host 10 and guest 12, preferably in the order in which they are received, into system queue 32 (step 51 of FIG. 4). System queue 32 is a first in, first-out (FIFO) storage mechanism for the raw host and guest keyboard events in this application sharing configuration. HEAS 36 can, for example, supervise the placement of raw guest keyboard events in system queue 32 by calling keyboard event module 31. Shadow queue 40 is provided, also for FIFO storage and transmission of raw keyboard events from guest 12 and host 10. In addition, supplementary information typically is included with each raw host or guest keyboard event input to shadow queue 40. For example, shadow queue 40 preferably carries with each raw host keyboard event data identifying the event as originating with the host. Shadow queue 40 also preferably carries with each raw guest event the translation of the guest event from guest keyboard driver 25. Shadow queue 40 can be part of HEAS 36 or can be a stand-alone data handling module.

In a preferred embodiment, keyboard event module 31 includes patch instruction 42. Patch instruction 42 causes a jump to patch subroutine 44, preferably located in HEAS 36, whenever keyboard event procedure 31 is called to execute to place raw host keyboard events into system queue 32 (step 52). Patch subroutine 44 marks the raw keyboard event as originating from the host (step 53). The marked host keyboard event is entered into shadow queue 40 (step 55), optionally with the unmarked raw host keyboard event. The unmarked raw host keyboard event is entered into system queue 32 in the conventional manner (step 54).

When keyboard event module 31 is called to execute to enter a raw guest keyboard event in system queue 32 (step 52), HEAS 36 will, for example, remove patch instructions 42 from keyboard event module 31. This allows keyboard event module 31 to run in the normal fashion to deposit the raw guest keyboard event into host system queue 32 (step 56), without a call being made to patch subroutine 44. Substantially simultaneously, in the preferred embodiment, HEAS 36 will deposit the translated guest keyboard event, as translated by, for example, guest keyboard driver 25, and the raw, untranslated guest keyboard event into shadow queue 40 (step 57). HEAS 36 can then replace patch instructions 42 over keyboard event module 31. Patch subroutine 44 never is called to run when keyboard event module 31 is called to deposit raw guest keyboard events into system queue 32.

In another embodiment, a separate entry point or path is provided to keyboard event module 31 for the raw host and guest keyboard events which are to be entered into system queue 32. In this embodiment, patch instructions 42 are written only over the entry point in keyboard event module 31 for raw host keyboard events and not the entry point for raw guest keyboard events. Consequently, in this embodiment also, patch subroutine 44 never is called to run when keyboard event module 31 is called to deposit raw guest keyboard events in system queue 32.

The flow of data through shadow queue 40 mirrors the flow of data through system queue 32. For example, for each position in system queue 32 holding a raw host or guest keyboard event, shadow queue 40 has an identical position holding, for example, the identical raw host or guest keyboard event, as well as additional information pertaining to the data. Preferably, if the position in shadow queue 40 includes a host keyboard event, the position further includes data identifying the event as a host keyboard event. As noted above, the host raw keyboard events preferably are marked by patch subroutine 44 (step 53), which preferably is part of HEAS 36. If the position in shadow queue 40 includes a guest raw keyboard event, in the preferred embodiment of the invention the position also includes a translation of the guest raw keyboard event, as made by guest keyboard driver 25.

Data flows through host system queue 32 and shadow queue 40 in a FIFO order. As shown in FIG. 3, system queue 32 and shadow queue 40 stand ready to deliver host, guest, host, host, guest, guest, guest and host keyboard data, in that order, to for example, shared application 34. As a keyboard event is delivered or made available to shared application 34 (step 58), shared application 34 is advised by keyboard event module 31, directly or through input module 30, of the exit from system queue 32 of the keyboard event, regardless of whether it is a host or a guest event. In the preferred embodiment, shared application 34 instructs input module 30 to issue a translation request to host keyboard driver 29 (step 59) to translate the exiting event. The translation request can be a "ToAscii" command when the invention is implemented in a "WINDOWS" X.X operating system environment (or a ToAsciiEx in "WINDOWS 95"). The translation request to keyboard driver 29 is a request for a translation of the raw host or guest keyboard event into an operating system character. To prevent host keyboard driver 29 from translating a guest raw keyboard event, a preferred embodiment of the invention includes patch instruction 48 on keyboard driver 29. Patch instruction 48 causes a jump to a patch subroutine 50, preferably in HEAS 36, whenever host keyboard driver 29 is called for a translation of a guest or host keyboard event. Patch subroutine 50 in HEAS 36 examines the identity of the keyboard event for which input module 30 has requested translation (step 60). For example, patch route 50 examines the corresponding event from shadow queue 40, which includes an identification of the source of the event as made by patch subroutine 44. If the event from shadow queue 40 is a host event, as labeled by patch subroutine 44, patch subroutine 50 returns the original translation instructions to keyboard driver 29, which are written over patch instructions 48, whereby keyboard driver 29 follows through with the translation (step 61) of the host keyboard event before it is entered in shared application 34 (step 63), directly or through input module 30. In the preferred embodiment, after keyboard driver 29 executes, HEAS 36 rewrites the patch instruction 48 onto keyboard driver 29.

In the event patch subroutine 50 identifies the event that keyboard driver 29 has been called on to translate as a guest event, patch subroutine 50 of HEAS 36 supervises delivery of the corresponding, already translated guest event from shadow queue 40 to shared application 34 (step 62), perhaps through input module 30. A guest keyboard event can be identified by examining shadow queue 40 for, for example, an absence of data identifying it as a host keyboard event or the presence of the translation. Patch instruction 48 and patch subroutine 50 effectively override the call to keyboard driver 29 to translate raw guest keyboard events for use by shared application 34. Shared application 34 therefore receives guest keyboard events which have been translated by guest keyboard driver 25, which presumably is compatible with the guest keyboard, whereas host keyboard driver 29 might not be.

Another embodiment includes a last event record module for receiving and holding for examination the keyboard event exiting shadow queue 40. As noted above, an event will exit shadow queue 40 substantially simultaneously with the exit of a corresponding event from system queue 32. The last event record will hold with the keyboard event the supplementary information referred to above, for example, in the case of guest events, the translation of the event made by guest keyboard driver 25. In the case of a host event, the supplementary information preferably includes an identification of the event as a host event. In this embodiment, patch subroutine 50 will look to the last event record for an identification of the source of a keyboard event exiting system queue 32 and for which input module 46 has requested a translation. Furthermore, a translated guest keyboard event will be passed to shared application 34 from the last event record as necessary.

In an alternative embodiment, patch instructions 48 can be written over an entry point in input module 30. The jump to patch subroutine 50 will then occur when input module 30 receives the instructions to call keyboard driver 29 for a translation. If the call was issued for a translation of a host keyboard event, patch subroutine 50 will write the original input module instructions over patch instructions 48, enabling input module 30 to call for execution of keyboard driver 29 to translate the host keyboard events. Patch subroutine 50 will replace patch 48 over the entry point to input module 30.

In this alternative embodiment, when requests to translate events which are guest keyboard events are made, patch instructions 48 on input module 30 will cause a jump to patch subroutine 50, which will instruct shadow queue 40 to deliver the corresponding, already translated guest keyboard event to shared application 34.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments configure the microprocessor to create specific logic circuits.

Furthermore, it should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. A computer-implemented method for sharing of one or more applications between a host and at least one guest, the host and at least one guest generating host and guest raw keyboard input, respectively, comprising the steps of:
   (a) receiving in the host a translated guest character, wherein the guest has generated the translated guest character by translating guest raw keyboard input;
   (b) marking the host raw keyboard input to provide a marked host keyboard input which corresponds to the host raw keyboard input;
   (c) storing in a shadow queue the translated guest character, and the marked host keyboard input corresponding to the host raw keyboard input;
   (d) translating the host raw keyboard input;
   (e) blocking the host from translating the guest raw keyboard input by:
      (i) providing a patch instruction in a host software module executing the translation;
      (ii) calling the host software module executing the translation, and
      (iii) jumping to a patch subroutine; and
   (f) using the received translated guest character and the translated host keyboard input in the host in the shared one or more applications.

2. The method of claim 1, wherein the guest translation of the guest raw keyboard input is initiated by a guest-executed application sharing program.

3. The method of claim 2, wherein the guest-executed application sharing program calls a guest operating system software module to make the translation.

4. The method of claim 3, wherein the guest operating system software module is one of a keyboard driver and input module.

5. The method of claim 1, further comprising the steps of:
   receiving in the host the guest raw keyboard input which corresponds to the translated guest character; and storing the guest raw keyboard input and the host raw keyboard input in a host storage queue.

6. The method of claim 1, wherein the step of blocking further comprises the steps of:

(iv) identifying the guest raw keyboard input; and (v) obtaining the translated guest character.

7. The method of claim 1, wherein the host software module executing the translation is one of a keyboard driver and input module in a host operating system.

8. The method of claim 1, wherein step (c) comprises the steps of:

(i) identifying the host raw keyboard input;

(ii) writing over the patch instruction with code; and (iii) making the translation.

9. The method of claim 8, wherein the host software module executing the translation is one of a keyboard driver and input module in a host operating system.

10. The method of claim 8, wherein step (c) further comprises the step of:

(iv) replacing the patch instruction.

11. An apparatus for sharing of one or more applications between a host and at least one guest, the host and at least one guest generating host and guest raw keyboard input, respectively, comprising:

(a) means for receiving in the host a translated guest character, wherein the guest has generated the translated guest character by translating guest raw keyboard input;

(b) means for marking the host raw keyboard input to provide a marked host keyboard input which corresponds to the host raw keyboard input;

(c) means for storing in a shadow queue the translated guest character, andthe marked host keyboard input corresponding to the host raw keyboard input;

(d) means for translating the host raw keyboard input;

(e) means for blocking the host from translating the guest raw keyboard input by:

(i) means for providing a patch instruction in a host software module executing the translation;

(ii) means for calling the host software module executing the translation, and (iii) means for jumping to a patch subroutine; and (f) means for using the received translated guest character and the translated host keyboard input in the host in the shared one or more applications.

12. The apparatus of claim 11, wherein the guest translation of the guest raw keyboard input is initiated by a guest-executed application sharing program.

13. The apparatus of claim 12, wherein the guest-executed application sharing program calls a guest operating system software module to make the translation.

14. The apparatus of claim 13, wherein the guest operating system software module is one of a keyboard driver and input module.

15. The apparatus of claim 11, further comprising:

means for receiving in the host the guest raw keyboard input which corresponds to the translated guest character; and means for storing the guest raw keyboard input and the host raw keyboard input in a host storage queue.

16. The apparatus of claim 11, wherein the means for blocking further comprises:

(iv) means for identifying the guest raw keyboard input; and (v) means for obtaining the translated guest character.

17. The apparatus of claim 11, wherein the host software module executing the translation is one of a keyboard driver and input module in a host operating system.

18. The apparatus of claim 11, wherein means (c):

(i) identifies the host raw keyboard input;

(ii) writes over the patch instruction with code; and (iii) makes the translation.

19. The apparatus of claim 18, wherein the host software module executing the translation is one of a keyboard driver and input module in a host operating system.

20. The apparatus of claim 18, wherein means (c) further:

(iv) replaces the patch instruction.

21. A storage medium having stored thereon machine-readable program code for sharing of one or more applications between a host and at least one guest, the host and at least one guest generating host and guest raw keyboard input, respectively, wherein, when the program code is executed by the host, the host implements the steps of:

(a) receiving in the host a translated guest character, wherein the guest has generated the translated guest character by translating guest raw keyboard input;

(b) marking the host raw keyboard input to provide a marked host keyboard input which corresponds to the host raw keyboard input;

(c) storing in a shadow queue the translated guest character, and the marked host keyboard input corresponding to the host raw keyboard input;

(d) translating the host raw keyboard input;

(e) blocking the host from translating the guest raw keyboard input by:

(i) providing a patch instruction in a host software module executing the translation;

(ii) calling the host software module executing the translation, and (iii) jumping to a patch subroutine; and (f) using the received translated guest character and the translated host keyboard input in the host in the shared one or more applications.

22. The storage medium of claim 21, wherein the guest translation of the guest raw keyboard input is initiated by a guest-executed application sharing program.

23. The storage medium of claim 22, wherein the guest-executed application sharing program calls a guest operating system software module to make the translation.

24. The storage medium of claim 23, wherein the guest operating system software module is one of a keyboard driver and input module.

25. The storage medium of claim 21, wherein the host further implements the steps of:

receiving in host the guest raw keyboard input which corresponds to the translated guest character; and storing the guest raw keyboard input in a host storage queue, wherein:

the host keyboard input also is stored in the host storage queue.

26. The storage medium of claim 21, wherein the step for blocking further causes the host to:

(iii) identify the guest raw keyboard input; and (iv) obtain the translated guest character.

27. The storage medium of claim 21, wherein the host software module executing the translation is one of a keyboard driver and input module in a host operating system.

28. The storage medium of claim 21, wherein step (c) causes the computer to:
(1) identify the host raw keyboard input;
(2) write over the patch instruction with code; and
(3) make the translation.

29. The storage medium of claim 28, wherein the host software module executing the translation is one of a keyboard driver and input module in a host operating system.

30. The storage medium of claim 28, wherein step (c) further causes the computer to:
(4) replace the patch instruction.

* * * * *